(12) United States Patent
Williams et al.

(10) Patent No.: US 7,639,642 B2
(45) Date of Patent: Dec. 29, 2009

(54) WIRELESS NETWORK MONITORING METHODS, CONFIGURATION DEVICES, COMMUNICATIONS SYSTEMS, AND ARTICLES OF MANUFACTURE

(75) Inventors: Brett Williams, Roseville, CA (US); Nathan Harmon, Roseville, CA (US); Duane Mentze, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1111 days.

(21) Appl. No.: 10/703,877

(22) Filed: Nov. 7, 2003

(65) Prior Publication Data

US 2005/0099977 A1  May 12, 2005

(51) Int. Cl.
*H04W 4/00* (2009.01)
(52) U.S. Cl. .................. 370/328; 370/338; 455/406; 455/407; 455/408; 455/434; 455/550.1; 455/556.1; 455/558
(58) Field of Classification Search .............. 370/328, 370/338; 455/406, 407, 408, 434, 550.1, 455/556.1, 558
See application file for complete search history.

(56) References Cited

U.S. PATENT DOCUMENTS

| | | | | |
|---|---|---|---|---|
| 5,267,261 A * | 11/1993 | Blakeney et al. | ............ | 370/332 |
| 5,291,543 A * | 3/1994 | Freese et al. | ................ | 455/408 |
| 5,768,695 A | 6/1998 | Fischer et al. | | |
| 5,987,062 A | 11/1999 | Engwer et al. | | |
| 6,069,887 A | 5/2000 | Geiger et al. | | |
| 6,198,915 B1 * | 3/2001 | McGregor et al. | .......... | 455/406 |
| 6,199,077 B1 * | 3/2001 | Inala et al. | .................. | 715/201 |
| 6,259,891 B1 | 7/2001 | Allen | | |
| 6,311,054 B1 * | 10/2001 | Korpela | ..................... | 455/406 |
| 6,529,728 B1 * | 3/2003 | Pfeffer et al. | ............... | 455/418 |
| 6,681,111 B2 * | 1/2004 | Ahn et al. | ................. | 455/432.2 |
| 6,941,356 B2 * | 9/2005 | Meyerson | .................... | 709/220 |
| 6,961,762 B1 * | 11/2005 | Yeap et al. | ................... | 709/221 |
| 7,194,432 B1 * | 3/2007 | Ritter et al. | .................... | 705/34 |
| 2002/0176579 A1 * | 11/2002 | Deshpande et al. | ......... | 380/270 |
| 2003/0027549 A1 * | 2/2003 | Kiel et al. | .................... | 455/405 |
| 2003/0120920 A1 | 6/2003 | Svensson | | |
| 2004/0203581 A1 * | 10/2004 | Sharon et al. | ............... | 455/406 |
| 2004/0242197 A1 * | 12/2004 | Fontaine | ..................... | 455/411 |
| 2005/0005013 A1 | 1/2005 | Saint-Hilaire et al. | | |
| 2005/0059396 A1 | 3/2005 | Chuah et al. | | |
| 2005/0060532 A1 | 3/2005 | Dorenbosch et al. | | |
| 2005/0101293 A1 | 5/2005 | Mentze et al. | | |
| 2005/0101318 A1 | 5/2005 | Williams et al. | | |

(Continued)

OTHER PUBLICATIONS

"HP Jetdirect 802.11b Print Servers—Wireless Security Concepts and Terminology"; http://h20015.www2.hp.com/en/document.jhtml?lc=en&docName=bpj0732.pdf; Jul. 10, 2003; 44 pps.

(Continued)

*Primary Examiner*—Stephen M D'Agosta

(57) ABSTRACT

Wireless network monitoring methods, configuration devices, communications systems, and articles of manufacture are described. According to one aspect, a wireless network monitoring method includes providing a communications device, providing a wireless network, storing wireless network access data using a configuration device, communicating the wireless network access data to the communications device using the configuration device, communicating the wireless network access data to the wireless network using the communications device to provide access of the communications device to the wireless network, and monitoring the access of the communications device to the wireless network.

24 Claims, 5 Drawing Sheets

U.S. PATENT DOCUMENTS

2005/0102529 A1* 5/2005 Buddhikot et al. .......... 713/200

OTHER PUBLICATIONS

"HP Jetdirect 802.11b Print Servers—Wireless Security Overview"; http://h20015.www2.hp.com/en/document.jhtml?ic=en&docName=bpj07460.pdf; Jul. 10, 2003; 2 pps.

"HP Jetdirect Administrators Manual"; http://h20000.www2.hp.com/bc/docs/support/SupportManual/bpj07646/bpj07646.pdf; Oct. 2002; pps. 256-261.

"Fascinator", http://webhome.idirect.com/-jproc/crypto/fascinator.html, 2 pages, Mar. 17, 2004.

* cited by examiner

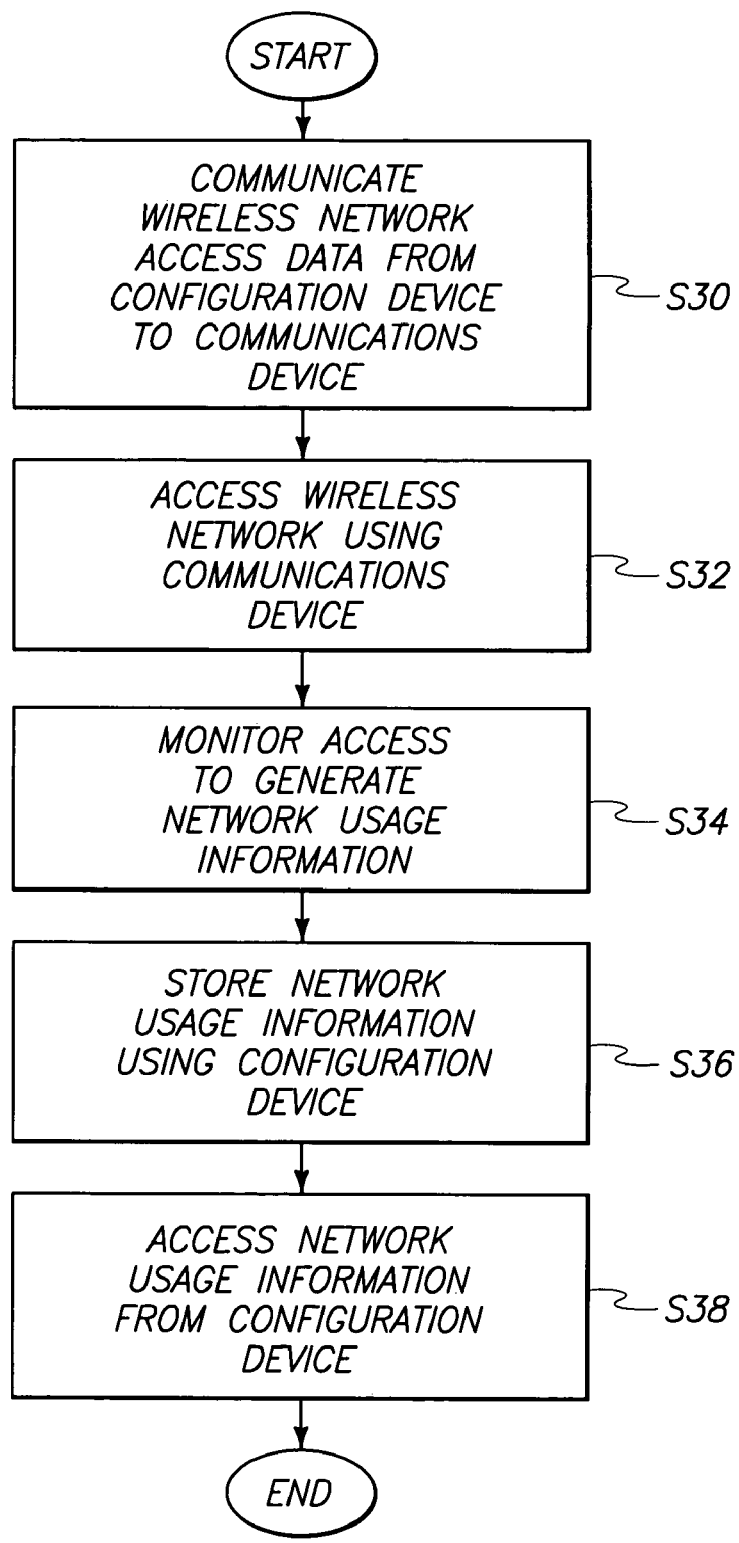

WIRELESS NETWORK MONITORING METHODS, CONFIGURATION DEVICES, COMMUNICATIONS SYSTEMS, AND ARTICLES OF MANUFACTURE

CROSS REFERENCE TO RELATED APPLICATIONS

This application is related to copending U.S. Patent Application entitled "Wireless Network Access Methods, Communications Device Configuration Methods, Configuration Devices, Communications Systems, And Articles Of Manufacture" having Ser. No. 10/703,862, listing Brett Williams, Nathan Harmon, and Duane Mentze as inventors, and copending U.S. Patent Application entitled "Wireless Network Communications Methods, Communications Device Operational Methods, Wireless Networks, Configuration Devices, Communications Systems, And Articles Of Manufacture", having Ser. No. 10/703,878, listing Duane Mentze, Nathan Harmon, and Brett Williams as inventors, which were filed concurrently and which are incorporated by reference herein.

FIELD OF THE INVENTION

Aspects of the invention relate to wireless network monitoring methods, configuration devices, communications systems, and articles of manufacture.

BACKGROUND OF THE INVENTION

Computing devices, such as personal computers, pocket PCs and other devices, continue to be used in new processing and communications applications. For example, the increased processing speeds and computational power of these devices has greatly enhanced the popularity and usage of the devices. More recently, advancements in networking and other communications between computing devices has also experienced significant improvements. Computing devices now quickly and efficiently communicate with other devices including e-mail, browsing, and other communications.

Portable computing devices have also experienced significant growth in capabilities and popularity. Wireless local area networks, such as wireless fidelity (WiFi) networks, have been developed to enable users to wirelessly access and communicate with other networked devices, such as Internet devices and other devices coupled with local area networks. For example, 802.11b networks are being used in an increased number of applications and locations to provide electronic connectivity. Coverage of the wireless local area network may be referred to as a hotspot. Public wireless local area networks may provide communications in office locations, public places, or other applications wherein electronic communications are desired. For example, wireless local area networks are now utilized in airport terminals, coffeehouses, and other establishments, providing public and/or membership access to the wireless local area network, and perhaps the Internet for browsing and e-mail communications.

Some drawbacks have been experienced with respect to connecting devices to wireless local area networks. For example, to connect to some networks, a computing device may use appropriate connection information including a network name (e.g., SSID) and mode of operation. In addition, the device may need to be authenticated and use appropriate encryption to send and receive communications with respect to the wireless local area network. Other information may also be necessary to establish communications between a given computing device and a wireless local area network. Accordingly, a user would manually configure the appropriate parameters or settings to provide network access. Without appropriate configuration of the computing device, a user may be unable to access the wireless local area network. However, manual configuration may be difficult for some users, subject to user errors, etc.

In one example, a user may desire to access a hotspot service provider (e.g., t-mobile.com) to access the public Internet. The user may setup the device for wireless access, purchase time from the provider, provide a computer at the location of the hotspot and manually attempt to connect to the service. At least some users may have difficulty manually configuring their computer to access the service, and as a result, become frustrated and avoid using the service.

In addition, it may be desired to facilitate access of numerous users to a wireless network. Further, it may be desired to track or otherwise monitor the users accessing a wireless network. In one example, it may be desired to identify the users and the amount of usage of the wireless network by the respective users.

According to at least some embodiments of the disclosure, improved methods and apparatus of accessing and/or monitoring access of wireless networks are described.

SUMMARY OF THE INVENTION

Wireless network monitoring methods, communications device configuration methods, configuration devices, communications systems, and articles of manufacture are described.

According to one aspect, a wireless network monitoring method comprises providing a communications device, providing a wireless network, storing wireless network access data using a configuration device, communicating the wireless network access data to the communications device using the configuration device, communicating the wireless network access data to the wireless network using the communications device to provide access of the communications device to the wireless network, and monitoring the access of the communications device to the wireless network.

According to another aspect, a configuration device comprises a communications interface configured to implement electronic communications of the configuration device with an external device which is externally located with respect to the configuration device, a storage device configured to store wireless network access data and network usage information and to output the wireless network access data and the network usage information to the communications interface for communication externally of the configuration device, and wherein the wireless network access data is arranged to configure the communications device to access and to implement communications with the wireless network, and the network usage information comprises information regarding access of the communications device to the wireless network.

According to a further aspect, a communications system comprises configuration means for providing wireless network access data, communications means for communicating with the configuration means, for receiving the wireless network access data from the configuration means, and for outputting the wireless network access data externally of the communications means, wireless network means for establishing the communications device as a node on the wireless network means responsive to receiving the outputted wireless network access data, and wherein the configuration means comprises means for providing network usage information corresponding to access to the wireless network means by the communications means.

According another additional aspect, an article of manufacture comprises a processor-usable medium comprising processor-usable code configured to cause processing circuitry of a communications device to establish communications with respect to a configuration device, access wireless access network data from a configuration device, establish communications of the communications device with the wireless network using the wireless network access data, and access network usage information corresponding to the access of the wireless network by the communication device.

Other aspects are disclosed as is apparent from the following description.

DESCRIPTION OF THE DRAWINGS

FIG. 6 is a flow chart illustrating another methodology for monitoring access to a wireless network according to another embodiment.

DETAILED DESCRIPTION OF THE INVENTION

Figure 1:
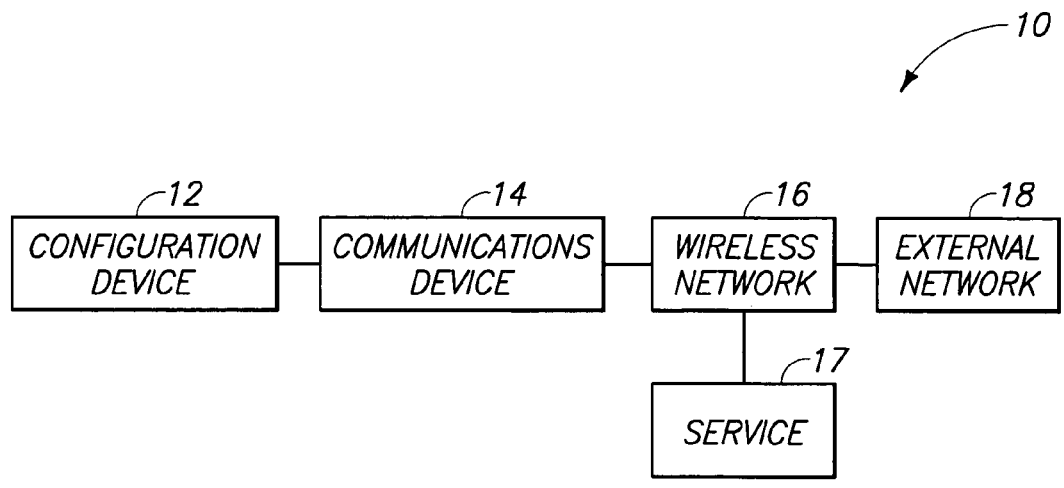
FIG. 1 is a functional block diagram illustrating a communications system according to one embodiment.

Referring to FIG. 1, an exemplary communications system 10 is shown. The depicted components of communications system 10 are configured to electronically communicate with another. The illustrated communications system 10 includes a configuration device 12, a communications device 14, a wireless network 16, a service 17, and an external network 18. Other configurations of system 10 are possible in other embodiments. For example, external network 18 may be omitted in at least one other embodiment.

Configuration device 12 operates to configure communications device 14 in one embodiment. In exemplary aspects, configuration device 12 configures communications device 14 to communicate with wireless network 16. Communications device 14 may be established as a node on wireless network 16 using configuration information (e.g., wireless network access data described below) received from configuration device 12 in one embodiment.

Communications device 14 is arranged by configuration device 12 to communicate with wireless network. Exemplary configurations of communications device 14 include a personal computer (PC) or pocket PC (e.g., iPAQ available from the Hewlett-Packard Company). Other embodiments of communications device 14 are possible. For example, communications device 14 may be arranged as any electrical device configured to implement wireless communications. Communications device 14 may include computational and/or data processing capabilities in some embodiments.

Wireless network 16 is configured to implement wireless communications with at least some devices or networks coupled with the network 16. Wireless network 16 may also provide wired connectivity to one or more devices or networks coupled therewith. An exemplary arrangement of wireless network 16 comprises a wireless local area network, such as a 802.11b network, in one example. Wireless network 16 may comprise a public wireless network and be referred to as a hotspot in but one implementation.

Service 17 performs electronic actions with respect to communications device 14 in at least one example. For example, service 17 may perform desired actions responsive to commands, requests, or other communications originating from communications device 14. Service 17 may be tailored to the location and application of the wireless network 16. One example of service 17 includes a hotspot service provider for exemplary embodiments wherein wireless network 16 provides public communications in an airport terminal, coffeehouse, or other location. Another example of service 17 includes managing image forming devices (e.g., printers) available on the wireless network 16. Another possible service 17 includes accessing services of a library via wireless network 16. The described services 17 are exemplary and provision of other electrical actions may be performed by service 17 with respect to communications device 14 in other embodiments.

External network 18 is coupled with wireless network 16. Communications device 14 may access external network 18 via wireless network 16 in the depicted example. One embodiment of external network 18 comprises the public Internet. Other arrangements of external network 18 are possible and may include wireless and/or wired components. Communications-device 14 may access a service (not shown) coupled with external network 18.

Figure 2:
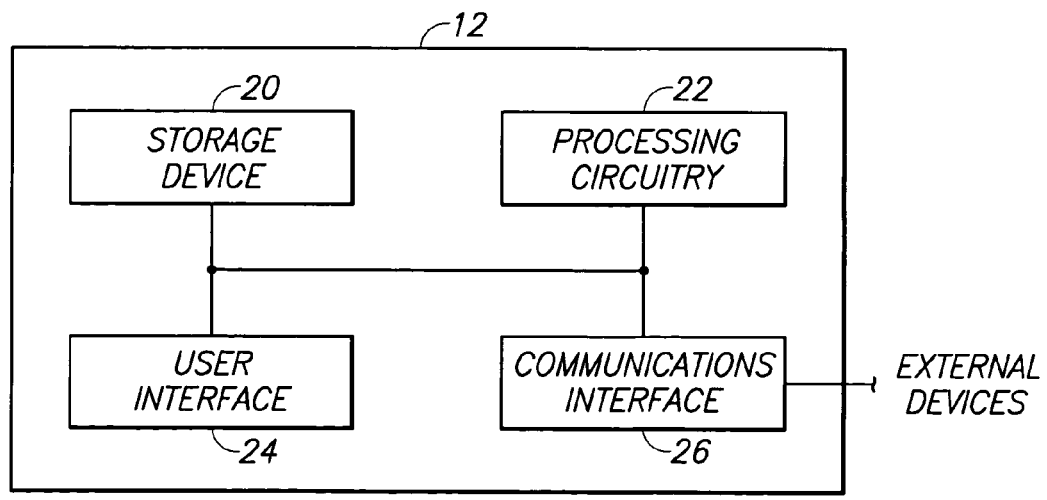
FIG. 2 is a functional block diagram illustrating hardware components of a configuration device or a communications device according to illustrative exemplary embodiments.

Referring to FIG. 2, an exemplary arrangement of configuration device 12 is shown. The depicted arrangement may also correspond to one embodiment of communications device 14. The illustrated configuration device 12 includes a storage device 20, processing circuitry 22, user interface 24, and communications interface 26. Configuration device 12 (or communications device 14) may include more, less, or alternative components. For example, for configuration device embodiments, the processing circuitry 22 and/or user interface 24 may be omitted.

Storage device 20 is configured to store electronic data and/or programming such as executable instructions (e.g., software and/or firmware), data, or other digital information and may include processor-usable media. Processor-usable media includes any article of manufacture that can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semi-conductor media. Some more specific examples of processor-usable media include, but are not limited to, a portable magnetic computer, diskette, such as a floppy diskette, zip disk, hard drive, random access memory, read only memory, flash memory, cache memory, and/or other configurations capable of storing programming, data, or other digital information. Storage device 20 of configuration device 12 and/or communications device 14 may be configured to store network usage information regarding access of communications device 14 to wireless network 16 and/or service 17 as described further below.

In one embodiment, processing circuitry 22 may comprise circuitry configured to implement desired programming. For example, the processing circuitry 22 may be implemented as a processor or other structure configured to execute executable instructions including, for example, software and/or firmware instructions. Other exemplary embodiments of processing circuitry 22 include hardware logic, PGA, FPGA, ASIC, and/or other structures. These examples of processing circuitry 22 are for illustration and other configurations are possible.

User interface 24 may be embodied as any appropriate apparatus configured to display or convey user information and/or receive user input. Exemplary embodiments of user interface 24 comprise a display, speaker, keyboard, mouse, etc.

Communications interface 26 is configured to couple with and implement communications with respect to external devices. Communications interface 26 may provide wired and/or wireless communications. Exemplary embodiments of communications interface 26 comprise electromagnetic transmit and receive circuitry (e.g., radio frequency, infrared, etc.) or other wireless circuitry, USB port, parallel port, or serial port. Communications interface 26 may be embodied in any appropriate configuration to externally communicate electronic data. In one embodiment, configuration device 12 is provided in communication with communications device 14 during communications between communications device 14 and wireless network 16 (e.g., accessing of wireless network 16). In other embodiments, configuration device 12 may configure communications device 14 and then be removed from communication with device 14.

For configuration device embodiments, storage device 20 may store network access data and service access data to be used to configure communications device 14 to access wireless network 16 and to access service 17. Network access data is arranged to facilitate connection of communications device 14 with wireless network 16 to enable communications. Service access data is arranged to facilitate access between communications device 14 to service 17.

The network access data may be tailored to the associated type of wireless network 16 to be accessed. Exemplary wireless network access data may comprise network identification information of the wireless network 16. Exemplary network identification information includes the network name, or Service Set Identifier (e.g., SSID), which identifies the Extended-Service Set (ESS). Network access data may comprise mode of operation information, for example specifying ad hoc peer-to-peer configuration, or infrastructure configuration. Network access data may comprise encryption information corresponding to encryption techniques utilized by wireless network 16, and may include a digital certificate or dynamic key information configured to permit encrypted communications of communications device 14 with wireless network 16. Network access data may comprise any other information configured to facilitate or assist a user with accessing and using wireless network 16.

Service access data may also be tailored to the type of service 17 to be accessed, and/or the location or implementation of the service 17. In one embodiment, service access data may comprise a navigation identifier associated with the service 17. For example, if service 17 comprises a node on wireless network 16, the navigation identifier may comprise an electronic address, such as an Internet Protocol (IP) address, of the service 17. If service 17 is coupled with external network 18 comprising the public Internet, the navigation identifier may comprise a Uniform Resource Locator (URL) of the service 17. Other types of navigation identifiers may be used providing any suitable navigation to service 17.

Service access data may additionally comprise authentication information usable to authenticate access between communications device 14 and service 17 and/or wireless network 16. For exemplary RADIUS authentication, authentication information may comprise a username and a password.

Service access data may also comprise a command to initiate performance of an action of service 17 with respect to communications device 14. For example, the command may automatically cause the loading of a web page associated with service 17 using communications device 14, display devices of service 17 accessible to communications device 14 (e.g., communicate a Universal Naming Convention (UNC) path command to initiate display of shared devices or services accessible to communications device 14, perhaps associated with the username) or provide other desired operations.

Exemplary service access data may include user information corresponding to a user of the communications device 14 and may initiate operations or actions of service 17 applicable and/or tailored to an identified user as identified by the user information (e.g., permit services for which the user has rights). The user information may cause service 17 to perform the action in consideration of the user information (e.g., automatically launch an application of service 17 using a command of the service access data and seed the application using user information of the service access data). Service access data may comprise any other information configured to facilitate or assist a user with accessing and using service 17.

According to at least one aspect, storage device 20 of configuration device 12 and/or communications device 14 may store network usage information. Network usage information corresponds to access and/or usage of wireless network 16 by communications device 14. Exemplary network usage information may comprise temporal information corresponding to a length of time of access to wireless network 16 by communication device 14. Network usage information may alternately or additionally comprise an amount of data communicated intermediate communications device 14 and wireless network 16. Network usage information may also include data regarding the quality and/or speed of the wireless connection. Other forms of network usage information may be used and include any information capable of quantifying and/or characterizing access of communications device 14 to wireless network 16. Generation and communication of network usage information according to exemplary aspects is described further below.

Information or data in addition to network access data, service access data, and network usage information may be stored using storage device 20 of either configuration device 12 or communications device 14. For example, storage device 20 may comprise an operating system and other applications for use by a user or processing circuitry 22 of configuration device 12 or communications device 14. Storage device 20 may comprise programming to assist a user with accessing wireless network 16. For example, storage device 20 may comprise programming to detect available wireless networks proximate communications device 14 and to display the options to a user (e.g., Windows XP™ Service Pack 1 available from Microsoft Corporation).

According to exemplary aspects described herein, processing circuitry 22 of the communications device 14 may access the network access data downloaded from configuration device 12, and utilize the information to select one of a plurality of detected wireless networks 16 and use the network access data to establish communications device 14 as a node on the wireless network 16. The processing circuitry 22 may also forward service access data to wireless network 16 to access service 17. Further, the processing circuitry 22 of communications device 14 may also forward commands, user seed information or other information to assist with accessing wireless network 16 and/or service 17. Accordingly, access to wireless network 16 and/or service 17 may be automated without user input. In other aspects, the processing circuitry 22 may request user input (or a user may input information without a request) during the process of accessing wireless network 16 and/or service 17 using respective ones of the network access data and service access data.

Additionally, storage device 20 of communications device 14 may comprise programming to process encrypted (e.g., decrypt) communications from device 12 in one embodiment. Configuration device 12 may encrypt the network access data and/or service access data in one exemplary embodiment.

Figure 3:
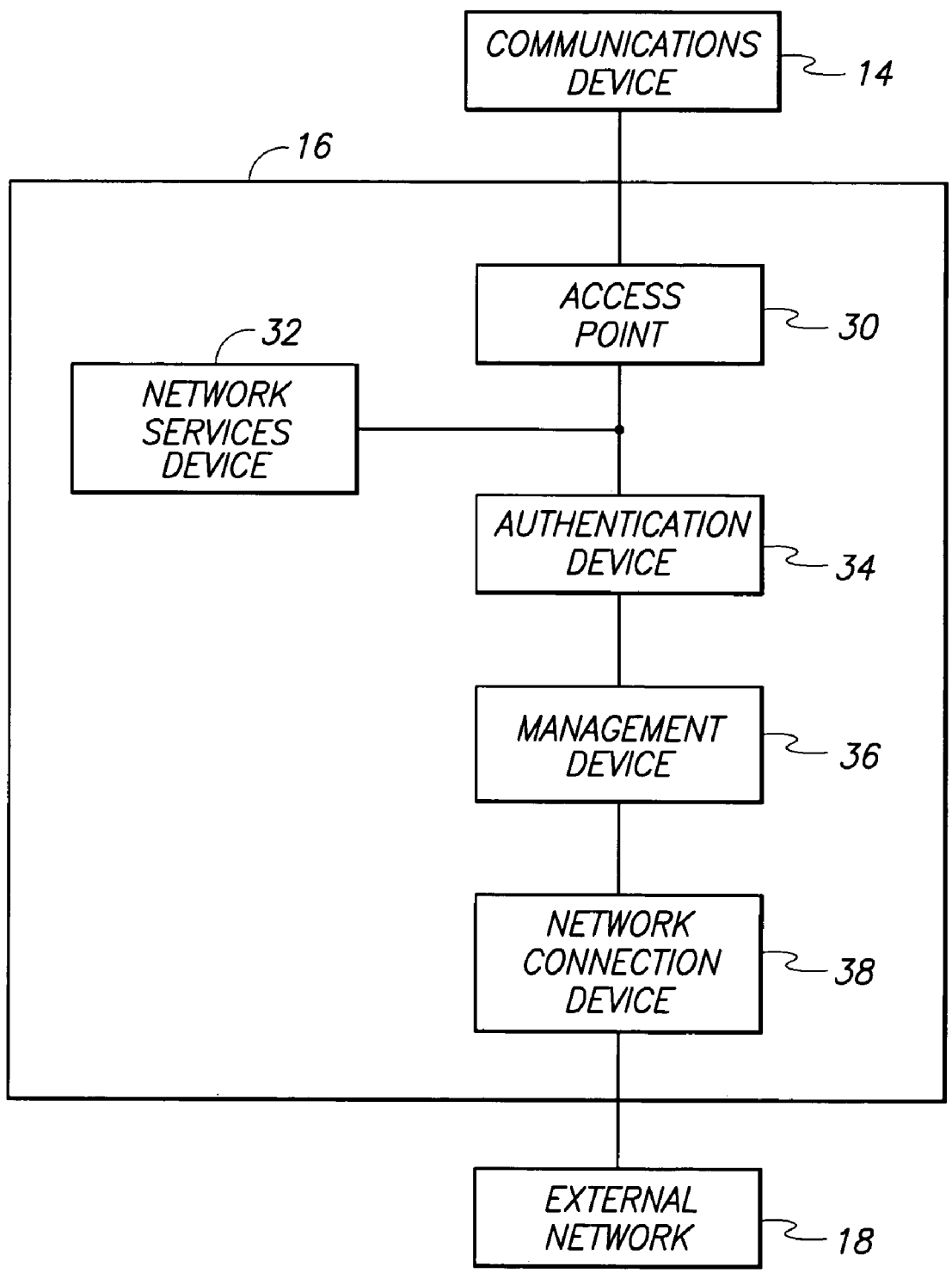
FIG. 3 is a functional block diagram of a wireless network according to one embodiment.

Referring to FIG. 3, an exemplary configuration of wireless network 16 arranged in a service level authentication embodiment is illustrated. The depicted wireless network 16 comprises an access point 30, a network services device 32, an authentication device 34, a management device 36, and a network connection device 38. Although illustrated as separate devices in FIG. 3, it is possible to implement functions or operations of a plurality of the separate devices within a single device.

Access point 30 comprises a wireless access point in the depicted embodiment configured to provide interfacing between wireless communications (e.g., with communications device 14) and wired devices. In addition, access point 30 may be arranged to control encryption operations (e.g., control management of encryption keys).

Network services device 32 is arranged to dynamically enable communications between nodes of wireless network 16. An exemplary network services device 32 comprises a Dynamic Host Configuration Protocol (DHCP) server configured to assign temporary or permanent electronic addresses to devices coupled with wireless network 16 including communications device 14.

Authentication device 34 is configured to authenticate communications from devices coupled with wireless network 16. In the exemplary service level authentication model of FIG. 3, it is possible for users to communicate with one another via wireless access point 30 without authentication. However, proper authentication is used for communications to external network 18. Accordingly, if the service (not shown in FIG. 3) is implemented using a device coupled with the access point 30, the service may be accessed without authentication. If the service is accessed via the external network 18, proper authentication is used to access the service in the exemplary depicted embodiment. Communications device 14 may communicate authentication information received from configuration device 12 to authentication device 34 for authentication. In one exemplary embodiment, authentication device 34 may be implemented as a RADIUS server and communications device 14 may communicate authentication information comprising a username and a password as described previously.

Management device 36 is configured to monitor, track and/or control access to and usage of wireless network 16 and/or service 17 by one or more of communications devices 14. Management device 36 may generate, store, and/or communicate network usage information to respective communication devices 14 or other appropriate recipient. Management device 36 may be implemented within a server in one embodiment.

Network connection 38 is configured to implement communications intermediate wireless network 16 and one or more external network 18. Network connection 38 may be implemented as a gateway, router and/or firewall in an exemplary embodiment wherein external network 18 comprises the public Internet.

Figure 4:
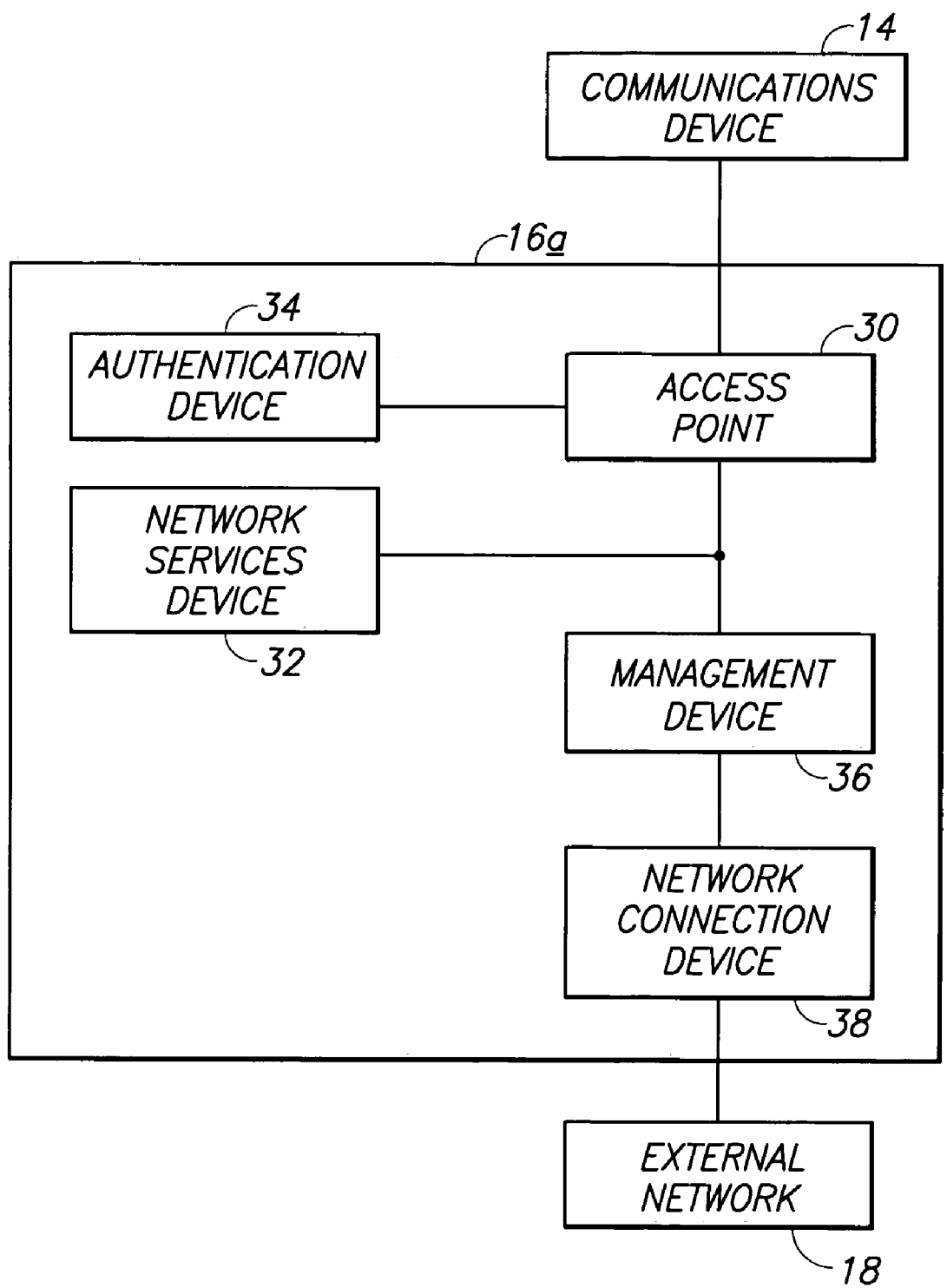
FIG. 4 is a functional block diagram of a wireless network according to another embodiment.

Referring to FIG. 4, an alternate embodiment of wireless network is illustrated with respect to reference 16*a* wherein like numerals represent like components with differences being represented by a suffix. The exemplary embodiment of FIG. 4 uses connection level authentication for providing access to the service. Authentication device 34 is coupled with access point 30 and communications device 14 is authenticated before accessing wireless network 16*a* or external network 18 in the embodiment of FIG. 4. Wireless network 16*a* may be configured according to standard 802.1x that permits wireless network 16*a* to scale by allowing centralized authentication of users. In one configuration, 802.1x uses authentication protocol Extensible Authentication Protocol (EAP). EAP messages are encapsulated within 802.1x messages and may be referred to as EAPOL or EAP over LAN. In the described example, access point 30 forwards EAP messages to authentication device 34 (e.g., messages comprising service access data) to authenticate communications device 14 before communications device 14 is given access to wireless network 16 or service 17.

Other configurations of wireless network 16 and/or other configurations for authentication are possible. For example, authentication may be implemented at a remote location of the service 17 (e.g., website supported by the public Internet) instead of within the wireless network 16. For example, the network connection 38 may redirect communications from a communications device 14 to the location of the service 17 for authentication, and if authenticated, the communications may be forwarded from the service 17 to an appropriate destination identified within the communications. Other embodiments are possible for authentication and implementing access to service 17.

At least some aspects of the disclosure relate to monitoring, tracking and/or control of access of and/or usage by one or more communications device 14 to wireless network 16 and/or service 17. Additional aspects relate to providing network usage information corresponding to the monitored access and/or usage. The monitoring, tracking and/or control of access and the generation of network usage information may be performed by one or more of configuration device 12, communications device 14, wireless network 16 and/or service 17 (e.g., performed by processing circuitry of one or more of entities 12, 14, 16, 17).

In one arrangement, network usage information is provided before the access and quantifies or otherwise defines a predetermined amount of access of communications device 14 to wireless network 16 and/or service 17. Thereafter, usage or access may be monitored and compared with the provided network usage information and the usage or access may be ceased responsive to the comparing indicating consumption or usage of the predetermined amount of access. Alternately and/or additionally, a user of communications device 14 may be given an option to purchase or otherwise add an additional quantity of access. Accordingly, in one aspect, monitoring of wireless network access comprises monitoring using network usage information.

In another arrangement, network usage information may be generated responsive to the access. For example, the duration of the access may be monitored during the wireless network accessing to provide the network usage information. The network usage information corresponding to the amount of access may be obtained responsive to the access. In one embodiment, the network usage information may be used to determine an amount of compensation owed by a user for the access.

Monitoring of access of communications device 14 to wireless network 16 and/or service 17 may be performed or implemented in different ways in different exemplary embodiments. Wherein the network usage information defines the predetermined amount of access described above in accordance with the first exemplary arrangement, the network usage information may be initially stored within configuration device 12 or other appropriate device. In one aspect, processing circuitry of configuration device 12 may monitor the access via a communications path with communications device 14 and operate to cease access once the predetermined amount of access is consumed or expended.

In another aspect, the network usage information comprising the predetermined amount of access may be communicated from the configuration device 12 to communications device 14. Processing circuitry of communications device 14 may receive the network usage information, monitor the access, and cease the access once the predetermined amount of access is consumed or expended.

In an additional aspect, the network usage information comprising the predetermined amount of access may be communicated from configuration device 12 to communications device 14 which operates to communicate the network usage information to wireless network 16 and/or service 17. The wireless network 16 and/or service 17 may implement the monitoring and ceasing access operations using the network usage information.

Communications system 10 may also be arranged wherein monitoring and ceasing operations are split between different ones of configuration device 12, communications device 14, wireless network 16, and service 17. For example, one of the devices may implement monitoring operations, and output a signal responsive to the monitoring indicating consumption of the predetermined amount of access. Another of the devices may receive the signal and operate to cease the access and/or offer additional access. Other implementations are possible.

As mentioned above, network usage information may also be generated responsive to the access of the wireless network 16 and/or service 17 by the communications device 14. For example, the temporal duration and/or amount of data communicated may be monitored to generate the network usage information. The network usage information resulting from monitoring of the access may be used to determine an amount of compensation owed by the associated user of the communications device 14 in one implementation.

In one aspect, processing circuitry of configuration device 12 is arranged to monitor the access via communications with communications device 14 to generate the network usage information. In another aspect, the access may be monitored by communications device 14, management device 36 of wireless network 14, and/or service 17 to generate the network usage information. Resulting generated network usage information may be internally stored within the generating device and/or communicated to configuration device 12 and/or other appropriate device for storage and subsequent retrieval or extraction by an administrator of wireless network 14 and/or service 17 to determine compensation owed for the access, or for other purposes.

Figure 5:
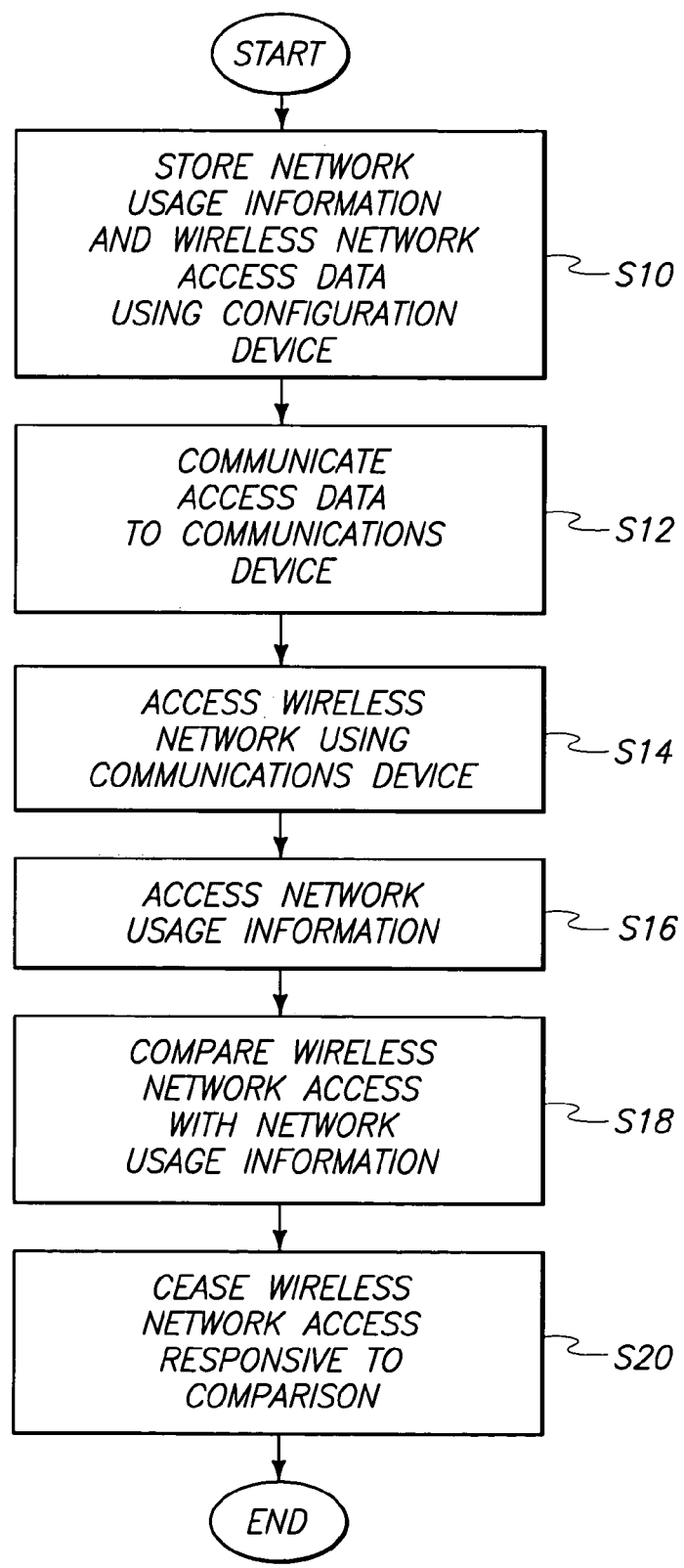
FIG. 5 is a flow chart illustrating a methodology for monitoring access to a wireless network according to one embodiment.

Referring to FIG. 5, a method of monitoring access to a wireless network is illustrated according to one possible embodiment. The exemplary method of FIG. 5 pertains to network usage information defining a predetermined amount of access of communications device 14 to wireless network 16. Steps of the depicted method may be implemented using configuration device 12, communications device 14, wireless network 16 and/or service 17. Other methods are possible including more, less or alternative steps At a step S10, network usage information defining the predetermined amount of access is stored within the configuration device. Wireless network access data is also stored within the configuration device.

At a step S12, wireless network access data is communicated from the configuration device to the communications device.

At a step S14, the communications device uses the wireless network access data to access the wireless network.

At a step S16, the network usage information of the configuration device is accessed. In one aspect, processing circuitry of the configuration device accesses the information. In another aspect, processing circuitry of the communications device, the management device of the wireless network, and/or the service accesses the network usage information.

At a step S18, the access of the wireless network by the communications device is compared with the predetermined amount of access specified by the network usage information. The comparison may be performed by the configuration device, communications device, wireless network and/or service.

At a step S20, the access of the wireless network by the communications device may be ceased responsive to the usage of the wireless network by the communications device reaching the predetermined amount of access.

In one exemplary implementation of the method of FIG. 5, a user receives the configuration device along with purchase of a product by an entity associated with the wireless network (e.g., purchase coffee from a coffeehouse supporting the wireless network and receive a corresponding configuration device). The configuration device may entitle the user to access the wireless network according to a predetermined amount of access specified by the configuration device. When the predetermined amount of access is consumed, the user may be notified of the ceasing of access and have the opportunity to purchase additional access to the wireless network. Other implementations are possible.

Referring to FIG. 6, a method of monitoring access to a wireless network is illustrated according to another possible embodiment. The exemplary method of FIG. 6 pertains to generating network usage information corresponding to an amount of access of communications device 14 to wireless network 16. Steps of the depicted method may be implemented using configuration device 12, communications device 14, wireless network 16 and/or service 17. Other methods may be used including more, less or alternative steps.

At a step S30, wireless network access data is communicated from the configuration device to the communications device.

At a step S32, the communications device uses the wireless network access data to access the wireless network.

At a step S34, network usage information is generated corresponding to monitoring the access of the wireless network by the communications device. Processing circuitry of the configuration device, communications device, the management device of the wireless network, and/or the service may be arranged to generate the network usage information in exemplary embodiments.

At a step S36, the generated network usage information may be stored using the configuration device. The network usage information may be initially communicated to the configuration device if generated within a different device. In other arrangements, the network usage information may be stored within communications device, the wireless network infrastructure, at the service and/or at another device.

At a step S38, the network usage information may be accessed from the configuration device in the depicted exemplary method. In other methods, the network usage information may be accessed from other devices if the devices contain the desired information. In one embodiment, the accessed network usage information may be accessed to determine an amount of compensation owed by the user of the communications device for accessing the wireless network and/or service.

In one exemplary implementation of the method of FIG. 6, a user receives the configuration device along with purchase of a product by an entity associated with the wireless network (e.g., purchase coffee from a coffeehouse supporting the wireless network). The configuration device may entitle the user to access the wireless network according to the stored wireless network access data. The network usage information is monitored and tracked during usage of the wireless network and/or service by the user. The network usage information may be stored on the configuration device. When finished with accessing the wireless network and/or service, the user may return the configuration device to the coffeehouse whereupon the compensation owed by the user would be determined using the network usage information stored on the configuration device. Other implementations are possible.

Aspects of the disclosure facilitate configuration of a communications device to access a wireless network, such as a public wireless network, and/or a service associated with a wireless network. At least some embodiments of the disclosure simplify and condense tasks used to connect to a wireless network and/or a service available on the network. Monitoring access or usage of the wireless network and/or service by the communications device is also facilitated according to some aspects. The tasks used to connect to a wireless network, and sell and/or monitor the access to the wireless network may be simplified and condensed according to one embodiment.

The protection sought is not to be limited to the disclosed embodiments, which are given by way of example only, but instead is to be limited only by the scope of the appended claims.

What is claimed is:

1. A wireless network monitoring method comprising:
   providing a communications device configured to access a wireless network;
   storing wireless network access data using a configuration device;
   communicating the wireless network access data to the communications device using the configuration device;
   communicating the wireless network access data to the wireless network using the communications device to provide access of the communications device to the wireless network;
   monitoring the access of the communications device to the wireless network;
   providing network usage information regarding the access to the wireless network by the communications device using the monitoring; and
   storing the network usage information using the configuration device.

2. The method of claim 1 wherein the providing the access comprises establishing the communications device as a node on the wireless network.

3. The method of claim 1 wherein the monitoring comprises monitoring using the configuration device.

4. The method of claim 1 wherein the monitoring comprises monitoring using the wireless network.

5. The method of claim 1 wherein the monitoring comprises monitoring using the communications device.

6. The method of claim 1 wherein the monitoring comprises monitoring using a service coupled with the wireless network.

7. The method of claim 1 wherein the monitoring comprises monitoring access of the communications device to a service coupled with the wireless network.

8. The method of claim 1 further comprising determining compensation for the access using the monitoring.

9. The method of claim 1 wherein the communicatings individually comprise communicating information defining a predetermined amount of access to the wireless network by the communications device.

10. The method of claim 9 wherein the monitoring comprises comparing an amount of access with the information comprising a predetermined amount of access, and further comprising ceasing the access as a result of the comparing indicating usage of the predetermined amount of access.

11. The method of claim 1 wherein the communicatings of the wireless network access data individually comprise communicating network identification information of the wireless network.

12. The method of claim 1 wherein the wireless network access data comprises data configured to enable the communications device to implement communications via the wireless network from a state wherein the communications device cannot implement communications via the wireless network.

13. The method of claim 1 further comprising establishing an electrically conductive connection between the configuration device and the communications device, and wherein the communicating the wireless network access data to the communications device comprises communicating using the electrically conductive connection coupled with both the configuration device and the communications device.

14. The method of claim 1 wherein the communicating the wireless network access data to the communications device comprises communicating independent of the wireless network.

15. The method of claim 1 wherein the communicating the wireless network access data to the communications device comprises communicating using the configuration device which is distinct and external from the communications device.

16. The method of claim 1 further comprising establishing a communications link between the configuration device and the communications device before the communicating the wireless network access data to the communications device and breaking the communications link after the communicating the wireless network access data to the communications device.

17. A wireless network monitoring method comprising:
   providing a communications device configured to implement wireless communications;
   providing a configuration device comprising wireless network access data for a respective wireless network;
   communicating the wireless network access data from the configuration device to the communications device to configure the communications device to access the respective wireless network;
   providing network usage information regarding an amount of access of the communications device with respect to the wireless network using the configuration device;
   communicating the network usage information to the configuration device using the communications device;
   storing the network usage information using the configuration device; and
   accessing the stored network usage information.

18. The method of claim 17 further comprising providing information defining a predetermined amount of access to the wireless network by the communications device.

19. The method of claim 18 further comprising communicating the information defining the predetermined amount of access to the communications device.

20. The method of claim 17 further comprising monitoring the access of the communications device to the wireless network using the configuration device, and the providing the network usage information uses a result of the monitoring.

21. The method of claim 17 wherein the wireless network access data comprises data configured to enable the communications device to implement communications via the wireless network from a state wherein the communications device cannot implement communications via the wireless network.

22. The method of claim 17 wherein the communicating the wireless network access data to the communications device comprises communicating independent of the wireless network.

23. The method of claim 17 wherein the communicating comprises communicating from the configuration device which is distinct and external from the communications device.

24. A wireless network monitoring method comprising:
providing a communications device configured to access a wireless network;
storing wireless network access data using a configuration device;
communicating the wireless network access data to the communications device using the configuration device;
communicating the wireless network access data to the wireless network using the communications device to provide access of the communications device to the wireless network; and
monitoring the access of the communications device to the wireless network, wherein the monitoring comprises:
providing network usage information regarding the access of the communications device to the wireless network;
communicating the network usage information from the communications device to the configuration device; and
extracting the network usage information from the configuration device.

* * * * *